United States Patent
Bönsch et al.

(10) Patent No.: US 9,381,473 B2
(45) Date of Patent: Jul. 5, 2016

(54) DEVICE FOR FOAMING MILK, BEVERAGE MAKER COMPRISING SAID DEVICE, AND METHOD FOR FOAMING MILK

(75) Inventors: Torsten Bönsch, Geislingen/Steige (DE); Sander Dollner, Neu-Ulm (DE); Johannes Bais, Ulm (DE); Marcus Ludwig, Elchingen (DE)

(73) Assignee: WMF WÜRTTEMBERGISCHE METALLWARENFABRIK AKTIENGESELLSCHAFT (DE)

( * ) Notice: Subject to any disclaimer, the term of this patent is extended or adjusted under 35 U.S.C. 154(b) by 283 days.

(21) Appl. No.: 14/118,806

(22) PCT Filed: May 21, 2012

(86) PCT No.: PCT/EP2012/002155
§ 371 (c)(1),
(2), (4) Date: Mar. 14, 2014

(87) PCT Pub. No.: WO2012/159729
PCT Pub. Date: Nov. 29, 2012

(65) Prior Publication Data
US 2014/0197554 A1    Jul. 17, 2014

(30) Foreign Application Priority Data
May 20, 2011    (DE) .......................... 10 2011 102 734

(51) Int. Cl.
*B01F 3/04*    (2006.01)
*A47J 31/44*    (2006.01)
*A23C 9/00*    (2006.01)

(52) U.S. Cl.
CPC .............. *B01F 3/04446* (2013.01); *A23C 9/00* (2013.01); *A47J 31/4485* (2013.01); *B01F 3/04099* (2013.01)

(58) Field of Classification Search
CPC ........... A47J 31/00; A47J 31/40; A47J 31/44; B01F 3/04; B01F 3/04099; B01F 3/04446; A23C 9/00

USPC .................... 261/37, 72.1, 76; 99/323.1, 453; 426/474
See application file for complete search history.

(56) References Cited

U.S. PATENT DOCUMENTS 7,550,169 B2 * 6/2009 Green ................. A47J 31/4485
426/564
2005/0223911 A1    10/2005 Landolt
(Continued)

FOREIGN PATENT DOCUMENTS

DE    202009011184    12/2009
EP    0919176    6/1999
(Continued)

OTHER PUBLICATIONS

"International Application No. PCT/EP2012/002155, International Search Report and Written Opinion mailed Aug. 14, 2012", (Aug. 14, 2012), 12 pgs.
(Continued)

*Primary Examiner* — Robert A Hopkins
(74) *Attorney, Agent, or Firm* — Schwegman, Lundberg & Woessner, P.A.

(57) ABSTRACT

The present invention relates to a device for frothing up a liquid, in particular cold and/or unheated milk, having a liquid supply line for supplying the liquid, an air supply line which opens into the liquid supply line for supplying air into the liquid, a discharge line which is configured downstream of the opening of the air supply line into the liquid supply line for discharging the mixture of liquid and air, a first conveying unit, in particular a pump, which is provided for conveying the liquid through the liquid supply line and/or the mixture through the discharge line and a mixing unit which is provided downstream of the opening in the discharge line, the mixing unit including at least one narrow place or being configured as narrow place of the discharge line.

16 Claims, 5 Drawing Sheets

(56) References Cited

U.S. PATENT DOCUMENTS

Figure 1:
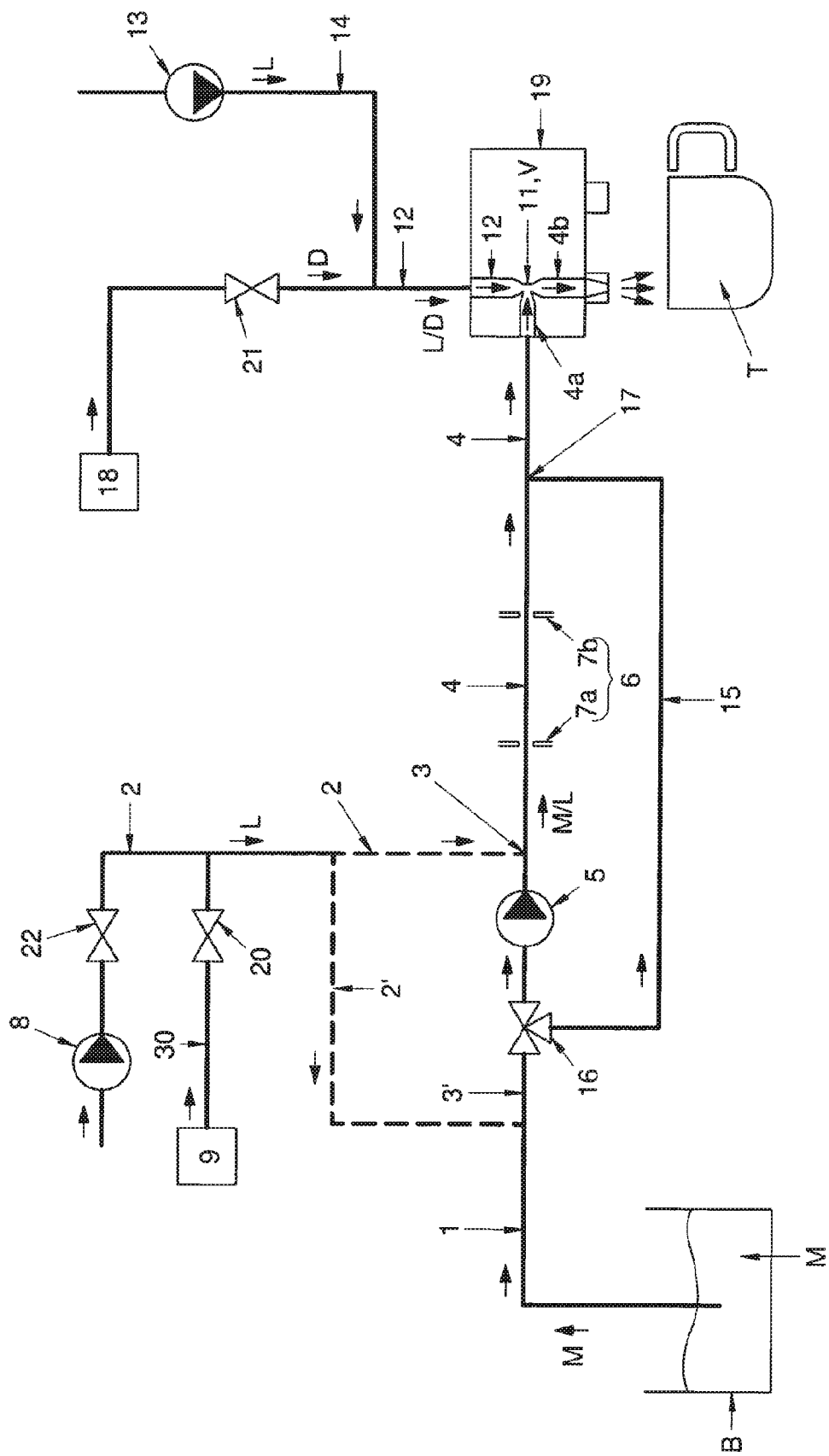

| | | | |
|---|---|---|---|
| 2009/0089034 A1 | 4/2009 | Penney et al. | |
| 2009/0092728 A1 | 4/2009 | Coccia et al. | |
| 2011/0070349 A1 | 3/2011 | Burri et al. | |
| 2011/0311694 A1 | 12/2011 | Broennimann et al. | |
| 2015/0024103 A1* | 1/2015 | Bronnimann | A23C 9/00 426/474 |

FOREIGN PATENT DOCUMENTS

| | | |
|---|---|---|
| EP | 1519670 | 4/2005 |
| EP | 1785074 A1 | 5/2007 |
| EP | 2042063 | 4/2009 |
| EP | 2189085 | 5/2010 |
| EP | 2294952 | 3/2011 |
| EP | 2294952 B1 | 12/2011 |
| JP | 2007-130480 A | 5/2007 |
| JP | 2007-259928 A | 10/2007 |
| JP | 2008-531163 A | 8/2008 |
| JP | 2011-62528 A | 3/2011 |
| WO | WO-2006/090183 A2 | 8/2006 |
| WO | WO-2008/083941 | 7/2008 |
| WO | WO-2010/026053 A1 | 3/2010 |
| WO | WO-2010/100170 A1 | 9/2010 |

OTHER PUBLICATIONS

"European Application Serial No. 12722684.3, Office Action mailed Nov. 25, 2015", (w/ English Translation), 8 pgs.

"International Application No. PCT/EP2012/002155, International Preliminary Report on Patentability dated Nov. 20, 2013", (w/ English Translation), 12 pgs.

* cited by examiner

DEVICE FOR FOAMING MILK, BEVERAGE MAKER COMPRISING SAID DEVICE, AND METHOD FOR FOAMING MILK

PRIORITY CLAIM TO RELATED APPLICATIONS

This application is a national stage application under 35 U.S.C. §371 of PCT/EP2012/002155, filed May 21, 2012, and published as WO 2012/159729 A1 on Nov. 29, 2012, which claims priority to German Application No. 10 2011 102 734.7, filed May 20, 2011, which applications and publication are incorporated by reference as if reproduced herein and made a part hereof in their entirety, and the benefit of priority of each of which is claimed herein.

The present invention relates to a device for frothing up a liquid, in particular cold and/or non-actively heated milk, to a drinks preparer which comprises such a device (in particular to an electrically operated fully automatic coffee machine) and also to a method for frothing up a liquid.

The preparation of cold coffee drinks is experiencing growing demand. In particular in Asiatic countries, there is an extensive market for such drinks in the summer months. Preparation of such drinks is generally effected by the hot-brewed coffee being dispensed into a vessel with ice cubes. Also, there is already the subsequently described solution from the state of the art for cold preparation of the milk component for coffee specialities, such as for example cappuccino, or for producing cold milk froth.

Hence, a device for frothing up a liquid such as milk is already known from the state of the art (DE 20 2009 011 184 U1). In the case of this device, the liquid and air are suctioned in by a pump and mixed in this pump (in addition steam can then also be supplied to the pump in order to produce heated milk froth). In the case of the device known from the state of the art, it is however impossible to vary the consistency of the milk froth or to adjust it as desired. Furthermore, an arrangement for producing milk froth is known from the state of the art (EP 2 042 063 A1), in which arrangement the milk froth is produced in a mixing portion which is configured as a mixing element having a complex structure which is suitable for multiple deflection of the milk-air mixture.

The state of the art (WO 2008/083941 A1) also knows a device for producing milk froth in which a single pump is provided both for conveying milk and for suctioning in the air required to produce the froth.

Devices for producing milk froth are also revealed in US 2009/0092728 A1, EP 1 519 670 B1 and also EP 2 294 952 A1.

It is therefore the object of the present invention, starting from the state of the art, to make available a device for frothing up a liquid (in particular milk), in particular also in cold, i.e. unheated, form, with which the consistency of the produced froth (in particular milk froth) can be influenced in a simple manner, i.e. can be changed. Furthermore, it is the object to make available such a device which has a simple and/or compact constructional form and can be cleaned with little difficulty. Finally, the object of the invention is to provide a drinks preparer (in particular: fully automatic coffee machine) which is provided with a frothing device according to the invention. Also a corresponding frothing method is the objective of the present invention.

This object is achieved by a device for frothing up a liquid (subsequently more simply termed also "the device") according to claim 1, by a drinks preparer according to claim 12 and by a method according to claim 13. Advantageous embodiment variants can be deduced respectively from the dependent claims.

Subsequently the present invention is described firstly in general then with reference to embodiments. The constructional features which are realised in combination with each other in the individual embodiments need not thereby be produced exactly in the configurations shown in the examples within the scope of the protection specified by the patent claims, but can be implemented constructively in any other way. In particular some of the shown features can also be omitted, can be produced at other positions of the device or cooperate with further constructional features in a different way. It is thereby also possible in particular to produce individual sub-assemblies of a shown embodiment in another of the shown embodiments.

A device according to the invention has a liquid supply line with which, e.g. from a separate vessel such as for example a tetrapak, the liquid to be frothed up can be conducted into the device. An air supply line, with which air can be supplied to the liquid to be frothed up, opens into this liquid supply line. Downstream of the opening of the air supply line into the liquid supply line, a discharge line is configured with which the mixture of liquid and air can be discharged, for example into an external vessel, such as e.g. a cup. Furthermore, a first conveying unit is provided (which can be configured in particular as a pump or milk pump) and serves for conveying the liquid through the liquid supply line and/or the mixture of liquid and air through the discharge line. Downstream of the opening of the air supply line into the liquid supply line, a mixing unit which serves for mixing the liquid with the air is provided (i.e. for example for dispersing the air in bubble form in the liquid). This mixing unit which can be configured, in the simplest case, as a pipe portion of the discharge line in which a diaphragm is inserted in order to reduce the pipe inner cross-section, includes at least one narrow place or is configured as narrow place(s) of the discharge line. The above-described mixing unit can hence consist of merely one narrow place of the discharge line, however can also include a plurality of narrow places in the discharge line.

This/these narrow place(s) can concern in particular (a) cross-sectional tapering(s) produced on the basis of (a)/diaphragm(s). As described subsequently also by way of example, also other constructional forms are however conceivable, which lead to at least one cross-sectional tapering in the discharge line (thus for example an object to be subjected to a flow can be disposed in the interior of the discharge line, about which the mixture of liquid and air—in the case of an overall increased outer diameter of the discharge line—must flow, wherein, despite the enlarged outer diameter of the discharge line at the site of the narrow place, the free cross-section in the discharge line which is provided by the difference of object cross-section and discharge line cross-section is then nevertheless reduced).

In a first advantageous embodiment, the device is configured for active introduction of air via the air supply line into the liquid. This can be produced for example by a further (active), i.e. second conveying unit (in particular: an air pump), being provided. This second conveying unit is preferably disposed in the air supply line (the device in this case hence having two conveying units, in a preferred variant precisely two conveying units). Both the above-described first conveying unit and the second conveying unit can be actuated for example with a microprocessor-based control unit so that the quantity of fluid conveyed by the conveying unit(s) per unit of time (i.e. in the case of the first conveying unit the quantity of liquid conveyed per unit of time or also, according to the constructional form of the device, the quantity of the mixture of liquid and air conveyed per unit of time and, in the second conveying unit, the quantity of air conveyed per unit of time) can be adjusted within predetermined limits. By means of such an active actuation of the two conveying units, the consistency of the froth, in particular of the milk froth (i.e. the proportion of air in the froth), can hence be adjusted as desired. For this purpose, also for example a storage unit can be provided, in which corresponding mixing ratios for air/liquid are stored in programme form which then can be selected according to the type of drink to be prepared by firstly pressing a button on the housing of the device.

By means of the first and the second conveying unit, the consistency of the produced froth can hence be changed with corresponding control or regulation of the ratio of the conveying power of the two conveying units.

Instead of a second conveying unit in the form of a pump, a compressed air container can however also be connected at the end of the air supply line which is orientated away from the opening of the air supply line into the liquid supply line (in addition a valve should then be provided in the air supply line with which the quantity of air introduced through the air supply line per unit of time via this compressed air container can be regulated; this can also be achieved on the basis of a microprocessor-based control unit). In a particular embodiment, a device according to the invention which includes such a compressed air container has precisely one conveying unit in the form of a pump (the first conveying unit).

In a particularly preferred variant, the mixing unit according to the invention includes a plurality of narrow places which are integrated at spacing from each other in succession in the discharge line (e.g. a plurality of perforated diaphragms which reduce respectively the free inner cross-section in the discharge line at the location of their positioning in comparison with the discharge line portions which are situated respectively upstream and downstream thereof). Adjacent narrow places are thereby integrated in a fixed position in the discharge line, preferably at a spacing in the range between 1 and 50 cm, preferably between 5 and 20 cm (however can, if required, also be produced as variable diaphragms, e.g. in the form of lamellar diaphragms which, actuated for example by the above-described control unit, allow a change in the free inner cross-section of the cross-sectional tapering).

The above-described variant having at least two successive narrow places of the discharge line (in particular precisely two in order to achieve a compact constructional form) effects a particularly good mixing and subsequent pressure reduction in the air-liquid mixture or air-milk mixture. The plurality of narrow places in the discharge line, which are flowed through in succession, can thereby also be configured in the shape of a nozzle or simply as sharp-edged diaphragms. In the case of this multiple provision of successive narrow places at a defined spacing, the pressure reduction in the discharge line is not effected in each case in one step, but in at least two steps.

It is particularly advantageous to provide two successive narrow places, in the case of which the ratio $F_a/F_b$ of the free cross-sectional area $F_a$ of the narrow place situated upstream and of the free cross-sectional area $F_b$ of the narrow place situated downstream is in the range between 1/1.05 and 1/16, preferably in the range between 1/1.1 and 1/2.0.

By providing a plurality of successive narrow places at defined spacing/spacings, in particular if the free cross-sectional areas (i.e. the openings) of the individual narrow places are adjusted as described above to different values, the quantity of froth, the porosity, the stability and the consistency of the produced froth (in particular milk froth) can be influenced as desired. The choice of different diaphragm- or flow-constrictor cross-sections thereby plays an important role if the narrow places are configured in the form of diaphragms or flow constrictors.

If the corresponding path portion of narrow places of the discharge line is configured as a removable and reinsertable discharge line part of the device according to the invention then, in addition, simple cleaning of the mixing unit can be ensured (if desired, also a rinsing connection can be integrated for supplying cleaning liquid into the corresponding path portion or also for other path portions in which the liquid or the mixture of liquid and air is guided).

For the concrete constructional configuration of the narrow place(s), a plurality of possibilities result according to the invention:

Thus the narrow place(s) can be configured as a throttle valve, as needle valve or as a nozzle. Likewise, a configuration as clamp, in particular as hose clamp, is possible, with which a flexible part of the discharge line (e.g. this part or also the entire discharge line can be configured as a flexible hose) can be compressed in order to produce a narrow place with a predetermined pressure which is determined by the construction of the hose clamp. In a preferred variant, the hose clamp-based narrow place is configured such that a degressive widening follows a progressive tapering, i.e. the cross-sectional reduction on the upstream input side of the narrow place is produced on a comparatively short stretch of e.g. 0.5 cm, whereas the widening of the cross-section on the downstream side of the narrow place is effected with a lower gradient, i.e. on a fairly long portion of the discharge line (e.g. over a stretch of 3 to 5 cm).

The narrow place(s) can be produced, as already indicated, also as diaphragm(s). The diaphragm, in particular as cross-sectional-tapering perforated diaphragm, can thereby be introduced into a portion of the discharge line. The inner perforated diameter can hereby preferably be between 0.5 and 2 mm. Diaphragms which are actuated for example by the above-described control unit and have a variable perforation diameter in the above-described range (e.g. lamellar diaphragms) are just as possible as diaphragms with a fixed inner perforation diameter in the above-described range.

Also annular gap diaphragms with a variable gap width and also a fixed gap width are possible (the gap width can hereby be varied for example within the range between 0.25 and 1 mm or be fixed at a defined value from this range).

Also a construction of a narrow place as a longitudinally extended annular gap which widens constantly in the downstream direction around a central cone is possible. The gap length can thereby be in the range between 1 cm and 15 cm in the flow direction. The gap width at the upstream end of the longitudinally extended annular gap can be between 0.25 and 1 mm, then the annular gap widens towards the downstream end up to an end gap width in the range of e.g. between 1 and 5 mm. The above-described variant of a longitudinally extended annular gap as narrow place has the advantage in particular that the mixture of liquid and air can be pressure-reduced comparatively slowly and constantly without undesired coarse air bubbles being formed: the result consequently is very good mixing and optimised consistency of the produced froth.

In the case of all the above-described embodiments, the narrow places can be configured either with a variable free cross-sectional area or with a free cross-sectional area which is adjusted in a fixed manner.

In addition to the at least one narrow place of the mixing unit, a path portion of the discharge line, downstream of the same, can be configured as a settling stretch with which the turbulent proportion of the flowing mixture of liquid and air can be reduced, i.e. the laminar proportion of this mixture can be increased. This path portion, in the simplest case, can be produced by a line portion with a constant free inner cross-section which has preferably a length between 5 and 50 cm, preferably between 30 and 50 cm (the portion need not thereby be configured as a straight portion but can extend for example in a meandering shape). For optimal settling of the mixture of liquid and air and as high a degree as possible of laminarity in the flow of this mixture, the longer settling stretches of 30 to 50 cm are thereby advantageous, which lead to a gradual pressure reduction with a low pressure difference per unit of length.

According to the invention, a different positioning of the first conveying unit (milk pump or mixing pump) is possible: the first conveying unit can be disposed upstream of the opening of the air supply line into the liquid supply line. In this case, the air is introduced after the first conveying unit and hence necessarily actively (via the second conveying unit or the pressure container). Likewise, it is however possible to dispose the first conveying unit in the region of the above-described opening (e.g. to configure in fact this opening as part of the first conveying unit by for example both an inlet for the liquid and an inlet for the air and also an outlet for the mixture being present in the first conveying unit). Finally, it is also possible to dispose the first conveying unit downstream of the above-described opening so that, in this case, the air is introduced in front of the first conveying unit. (In this case, the device can be configured either for active introduction of the air, e.g. via an additional, second conveying unit, or also for passive introduction of air by the first conveying unit suctioning in both the liquid and the air.)

In general, the mixing unit including the at least one narrow place is integrated in the discharge line downstream of the first conveying unit in the case of the present invention. It is however also conceivable to integrate the mixing unit in a downstream outlet of the first conveying unit, i.e. to configure the mixing unit as part of the first conveying unit.

In a further advantageous variant, the discharge line includes an additional mixing region which is configured preferably downstream of the mixing unit and into which a steam supply line opens. With the steam supply line, in addition steam from a steam producer or also a predetermined mixture of air and steam can be added to the mixture of liquid and air flowing through the mixing region. In the simplest case, this mixing region is configured as a simple, T-shaped line part. However, it is also possible to provide, at the place where the mixture of liquid and air and the steam or the steam-air mixture are brought together, a more complex shaped separate mixing region for emulsifying the milk froth heated via the steam supply before the mixture of liquid, air and partially or completely condensed steam is finally discharged out of this mixing region.

A particular embodiment of the device according to the invention which is provided with a steam supply line can be configured for active introduction of air into the steam supply line (in order to produce the mixture of air and steam which is introduced finally into the mixture of liquid and air). This takes place for example by means of a third conveying unit (in particular: pump) for conveying air which can be integrated for example in a further air supply line which opens into the steam supply line. It is also possible to provide a further compressed air container which is connected at the end of the further air supply line, which is orientated away from the opening of such a further air supply line into the steam supply line, to said further air supply line.

In a further embodiment variant, the above-described mixing region of the frothing device is configured as a Venturi nozzle. The steam supply line leading into the mixing region thereby forms the inlet of the Venturi nozzle and the portion of the discharge line leading out of the mixing region in the downstream direction forms the outlet of the Venturi nozzle (these two portions can be configured as two cones which are directed towards each other and are combined at the position of their narrowest diameter). The portion of the discharge line leading into the mixing region from the upstream direction then forms the removal pipe of the Venturi nozzle (this removal pipe is then placed for example at the above-described position of the narrowest diameter).

The above-described embodiment variant can be switched preferably (e.g. by firstly pressing a button on the device) between an operating mode for producing hot froth and an operating mode for producing cold froth: when producing cold froth, no supply of steam is effected (the steam path is closed for example by a valve, in this case liquid and air are supplied to the mixing unit, mixed and discharged by means of the first or the first and the second conveying unit). In the operating mode for producing hot froth (opening of the steam path) in addition hot steam from the steam producer can be added to the mixture of liquid and air. For optimised operation of the mixing region as Venturi nozzle, a bypass line can hereby be provided, which branches off from the liquid supply line upstream of the first conveying unit and opens into the discharge line either downstream of the mixing unit or opens upstream of the mixing unit but downstream of the first conveying unit into the liquid supply line and/or the discharge line. The branching of the bypass line from the liquid supply line can be configured in the form of a multiway switching unit (in particular: e.g. three-way valve, but also a hose clamp valve can be present in the bypass line instead of such a valve), with which the liquid to be supplied can be guided to the discharge line optionally either via the bypass line or via the first conveying unit. In the operating mode for producing hot froth, the path leading via the first conveying unit can hence be bypassed with the help of the above-described bypass line (likewise possibly the path portion via the mixing unit) so that, according to the known Venturi principle, liquid is entrained via the bypass line by the steam flowing through the mixing region (this entrained liquid is then frothed up by the supplied steam or the supplied steam-air mixture in hot form).

The frothing device according to the invention can be integrated in particular in a drinks preparer (coffee machine or electrically operated fully automatic coffee machine). The downstream end of the discharge line of the frothing device is then thereby preferably configured as a separate dispensing line of a dispensing head of the drinks preparer.

With the above-described device, a corresponding drinks preparer or also with a corresponding frothing method, both cold and hot milk froth can be produced (when dispensing with the mixing region with steam supply line, no active heating element is required, then merely cold milk froth can be produced).

Subsequently, the present invention is described in detail with reference to several embodiments. There are thereby shown:

FIG. 1 a first embodiment according to the invention for producing cold and hot milk froth with integrated Venturi nozzle.

Figure 2:
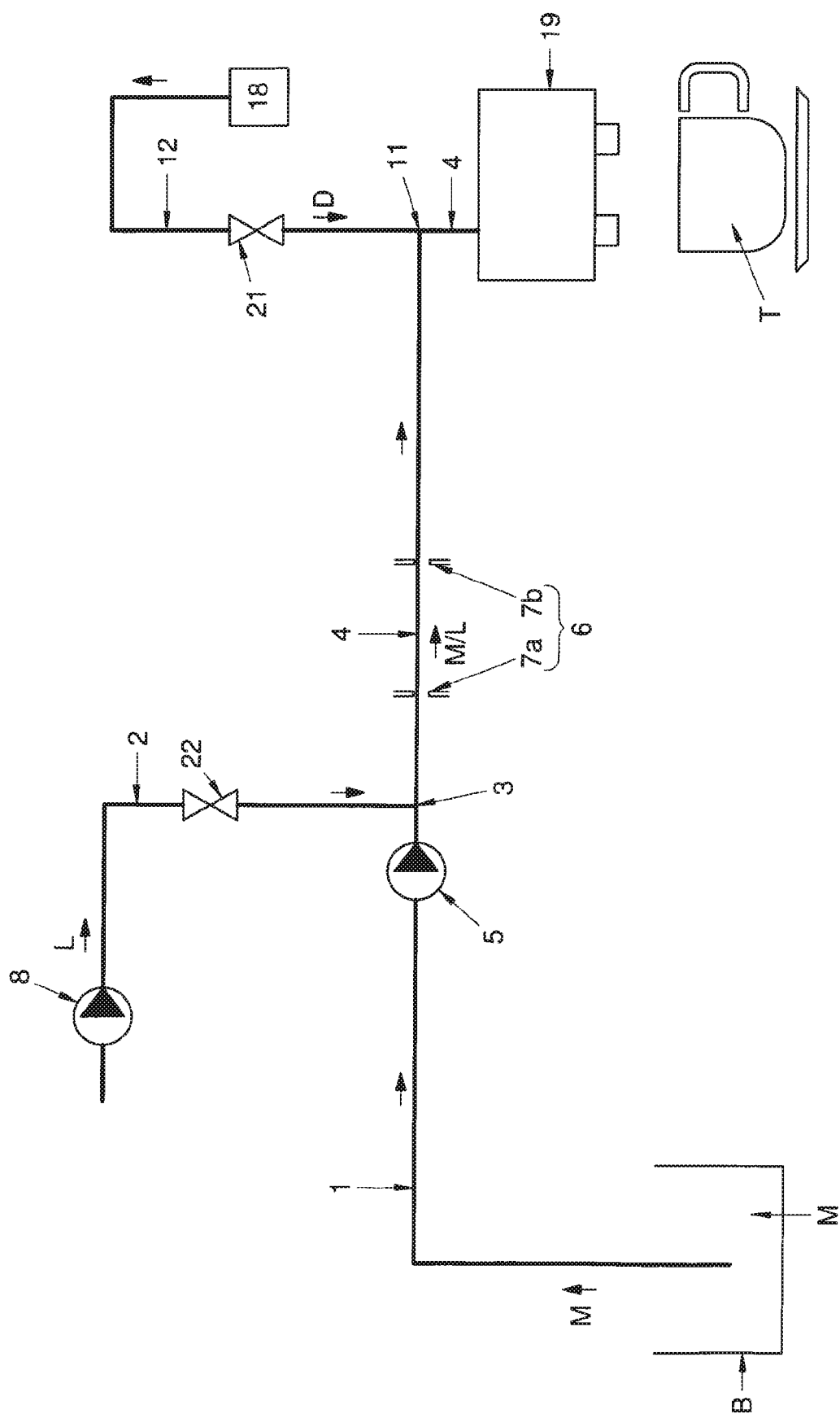

FIG. 2 a second embodiment for producing cold and also hot milk froth without a Venturi nozzle.

Figure 2A:
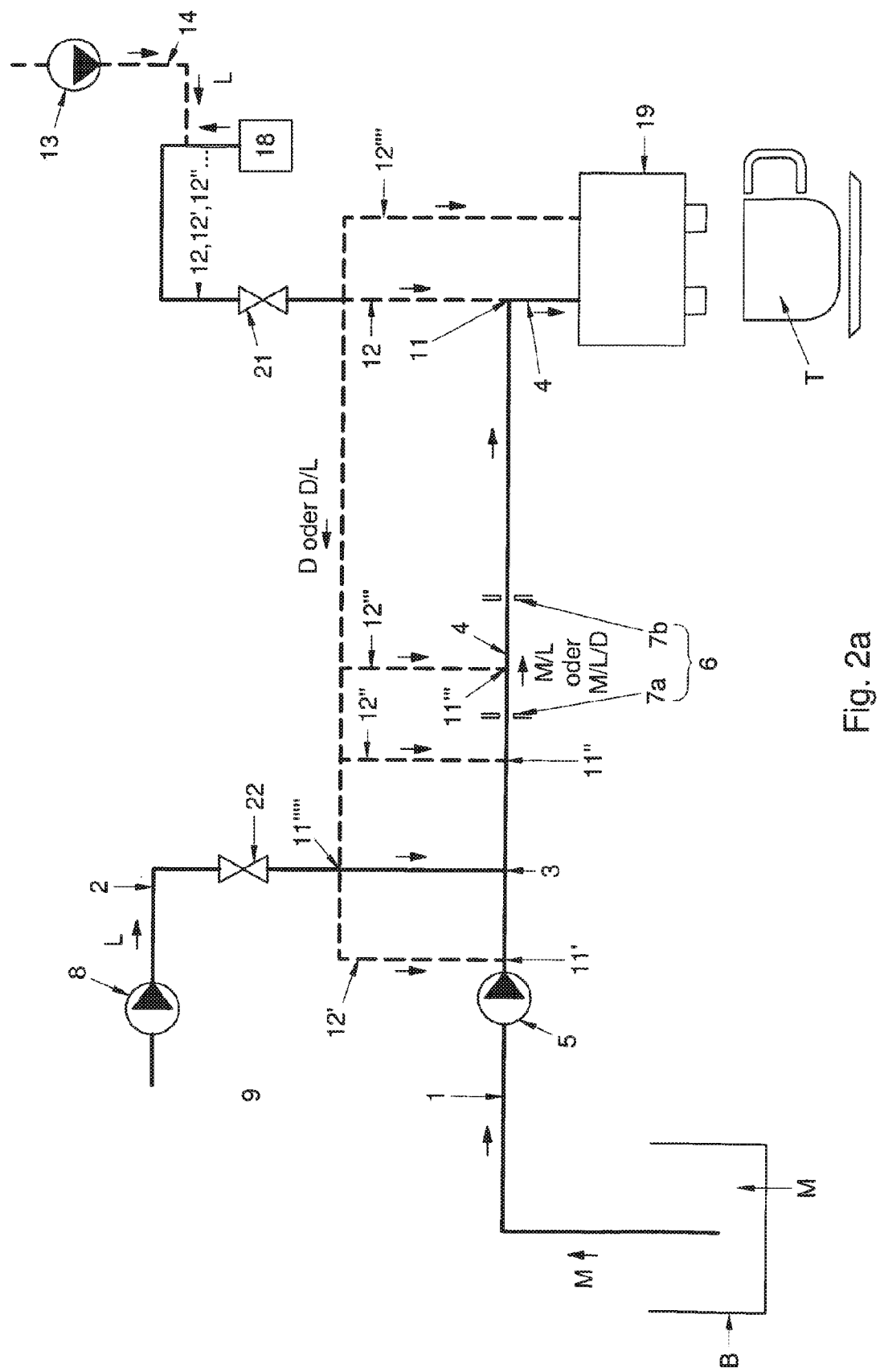

FIG. 2a a third embodiment for producing cold and also hot milk froth without a Venturi nozzle.

Figure 3:
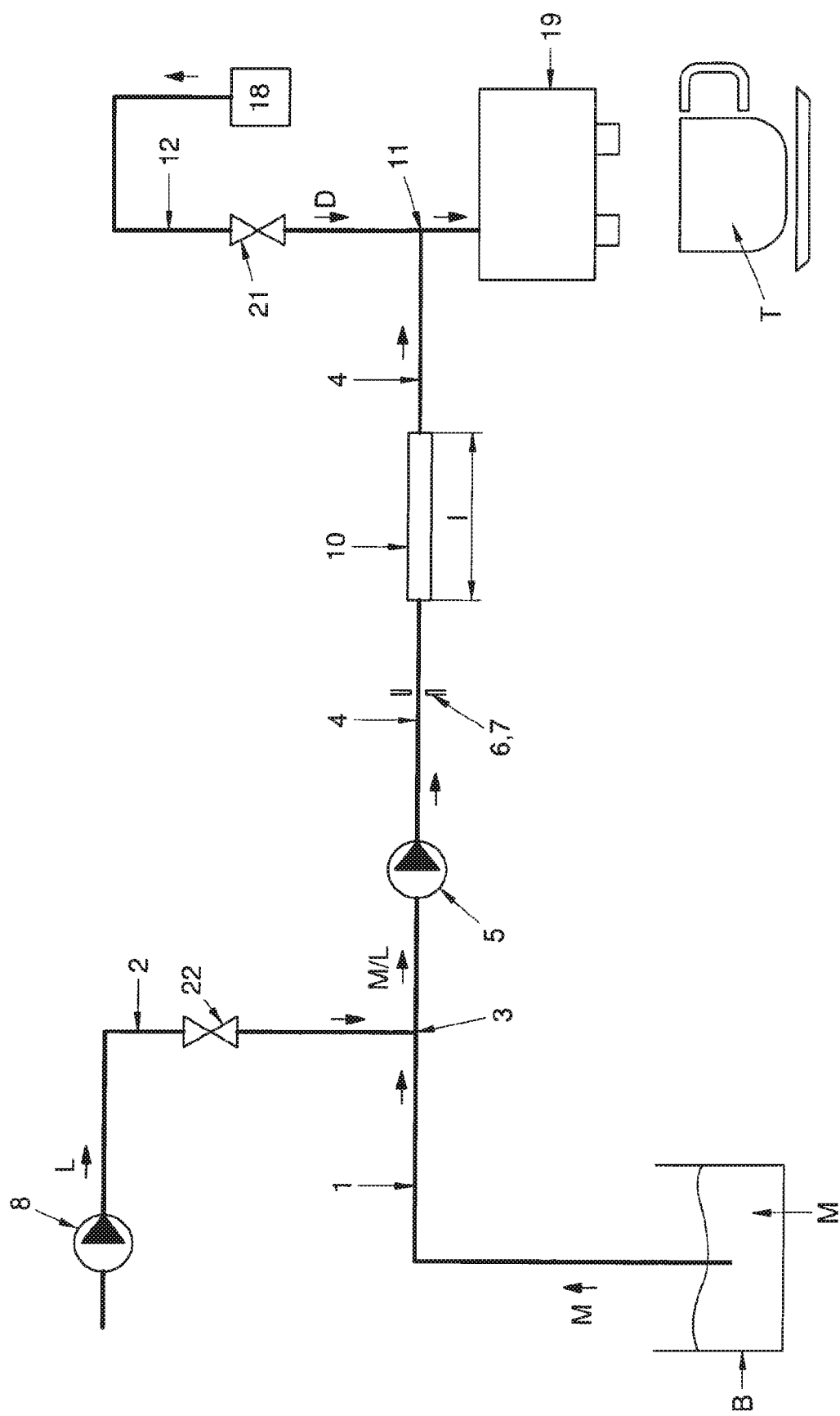

FIG. 3 a fourth embodiment for producing cold and also hot milk froth with a settling stretch.

Figure 4:
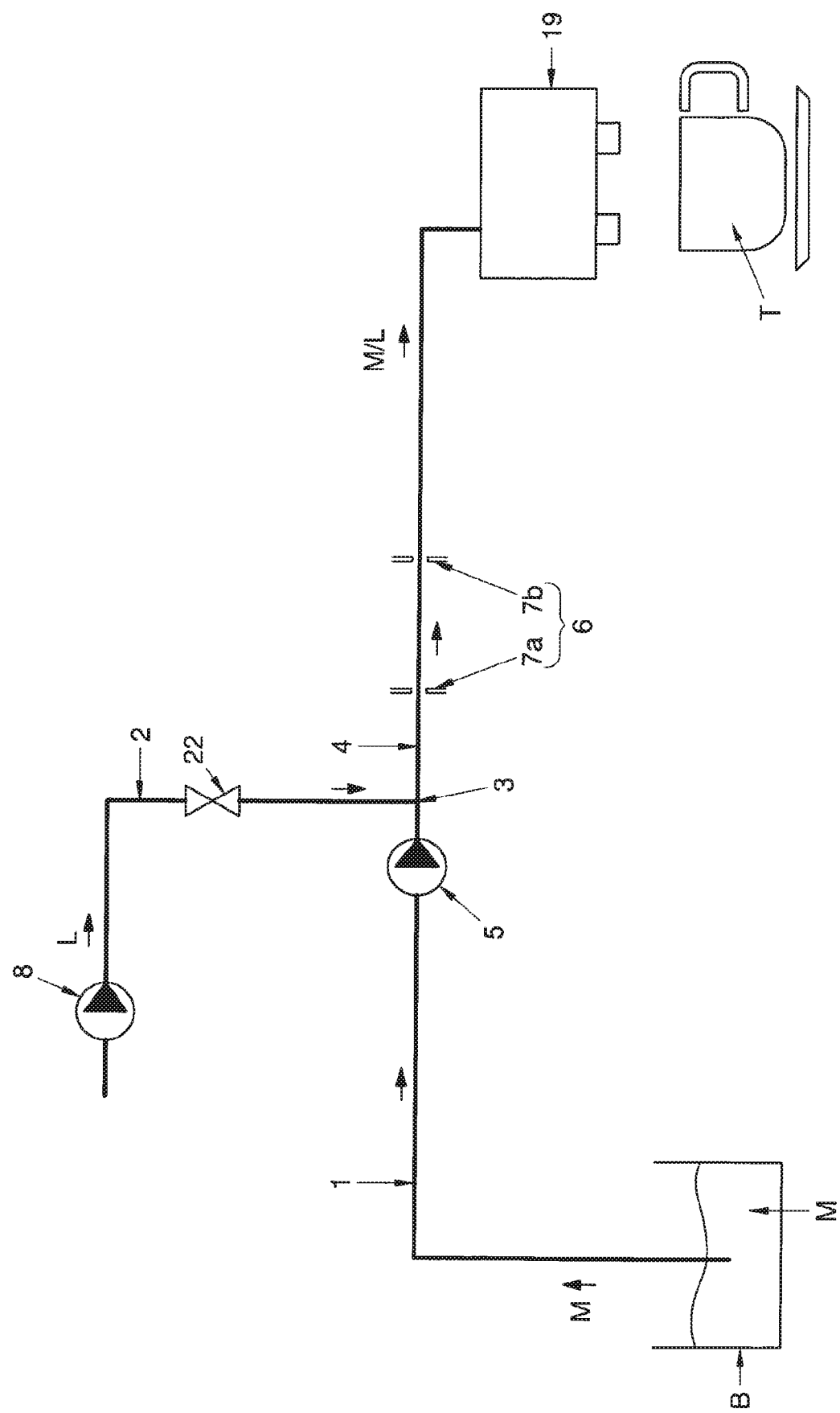

FIG. 4 an example for producing merely cold milk froth.

In the subsequently shown four embodiments of FIGS. 1 to 3, the frothing device according to the invention is integrated in a fully automatic coffee machine in a known design. Merely the dispensing head 19 of the fully automatic coffee machine is thereby shown, into which the downstream end of the discharge line of the respective embodiment of the frothing device according to the invention is integrated as separate dispensing line (coffee can then be dispensed in cold or hot form via the other dispensing line). The example of FIG. 4 shows a device according to the invention which is configured as independent device. The devices of FIGS. 1 to 3 can however also have an independent configuration.

FIG. 1 shows a first frothing device according to the invention which is integrated in a fully automatic coffee machine. The device includes a milk supply line 1 in which a milk pump (first conveying unit 5) is integrated. The milk pump upstream end of the milk line 1 is immersed in an external vessel B with milk M in the form of a tetrapak. Between this end of the milk line 1 and the milk pump 5, a three-way valve 16 is integrated in the milk line 1.

By means of an opening 3 which is configured as a simple T-shaped line part, an air supply line 2 opens into the milk line 1 downstream (viewed in the direction of the milk conveyance) of the pump 5. At the air upstream end thereof, orientated away from the opening 3, a second conveying unit (conveying pump 8) is integrated in the air supply line 2. In addition, a further air supply line 30 between the air pump 8 and the opening 3 opens into the air supply line 2. At this further air supply line 30, a stop valve 20 and also, upstream of the stop valve 20 (at the end orientated away from the opening into the air supply line 2), a compressed air container 9 is configured. Via the opening 3, air L can be added in a predetermined quantity to the milk M flowing downstream of the milk pump 5 in the milk line 1 (suctioned in from the container B via the milk pump 5) therefore in two different ways: either (when closing the valve 20) by suctioning in air L from the environment by means of the air pump 8 or (by adjusting the operation of the pump and with an open valve 20) from the compressed air container 9. The conveyed quantity of milk M per unit of time by the milk pump 5, the conveyed quantity of air L per unit of time by the air pump 8 and also the degree of opening of the valve 20 can be adjusted by a microprocessor-based control unit, not shown here, respectively to a desired value (which can be determined for example indirectly by means of a drinks choice button on the housing of the fully automatic coffee machine, not shown here).

The ratio of the quantity of air conveyed through the line 2 per unit of time, e.g. by the pump 8, and the quantity of milk M suctioned in by the pump 5 through the milk line 1 hence determines the mixture M/L of milk M and air L which is discharged downstream of the opening 3 (via the discharge line 4): the higher the proportion of air compared to the proportion of milk M, the more the suctioned-in milk is frothed.

The downstream side of the opening 3 is configured as a discharge line 4 which ultimately serves to discharge the mixture M/L of milk M and air L into an external container in the form of a cup T (via the dispensing head 19 of the fully automatic coffee machine which is also described subsequently).

Viewed in the flow direction of the mixture M/L, a mixing unit 6 is firstly configured in the discharge line 4 after the opening 3. This mixing unit 6 here includes two separate narrow places 7a and 7b in the discharge line 4. The portion of the discharge line provided with the mixing unit 6 is configured for this purpose as a rigid pipe portion in which the two narrow places 7a, 7b, at a spacing from each other, are configured in the form of perforated diaphragms which reduce the free inner cross-section of the discharge line pipe. The two narrow places or perforated diaphragms 7a, 7b here are integrated here in the discharge line 4 at a spacing of e.g. 10 cm (viewed in the flow direction of the mixture M/L). This spacing can very generally be between 1 and 50 cm, preferably between 5 and 20 cm. The upstream first perforated diaphragm 7a orientated towards the pump 5 has a perforation diameter of e.g. 1 mm. The downstream second perforated diaphragm 7b orientated away from the pump 5 has a perforation diameter of e.g. 1.5 mm, i.e. a greater perforation diameter than the first perforated diaphragm 7a. Very generally, the perforation diameter of the diaphragms can vary between 0.5 and 2 mm. The free inner cross-section of the discharge line portion of the discharge line 4 in which the two perforated diaphragms 7a, 7b are integrated has an inner diameter of e.g. 3 mm in the regions outside the perforated diaphragms. Hence in this discharge line portion, two narrow places, an upstream, greater tapering 7a and a downstream, less great tapering 7b are produced, which lead to a two-step pressure reduction for the mixture M/L flowing in the discharge line 4. This two-step pressure reduction enables optimised mixing of milk M and air L in the mixture M/L, optimised dispersion of small air bubbles in the milk M and hence optimised froth consistency of the milk froth (the consistency here can be adjusted in particular by changing the proportion of air L supplied via the air supply line 2.

The three-way valve 16, which is configured upstream of the milk pump 5 in the milk line 1, makes it possible, in a first switching state, to conduct the milk M through from the container B via the pump 5 and the opening 3 into the discharge line 4. In a second switching state, the three-way valve 16 connects the part of the milk line 1 situated upstream of the pump 5 via a bypass line 15 to the part of the discharge line 4 situated downstream of the two diaphragms 7a, 7b by the downstream part of the bypass line 15 opening into the part of the discharge line 4 situated downstream of the diaphragm 7b via an opening 17 configured as a simple T-shaped line part. In the second switching state of the three-way valve 16, bypassing of the milk pump 5, the opening 3 and the mixing unit 6 is hence effected.

In the previously described embodiment, the air supply line 2 opens into the liquid supply line 1 by its downstream end between the milk pump 5 and the upstream diaphragm 7a. Alternatively thereto, it is however conceivable here (as also in the following embodiments) also to have a constructional embodiment in which the downstream end of the air supply line 2 (which is provided in this case with the reference number 2') leads into the milk line 1 via an opening (reference number 3') which is disposed upstream of the pump 5 and also of the three-way valve 16. In the latter case, the required pressure level for the air is less and it is simpler to prevent undesired penetration of milk into the air line. If air 2 is introduced downstream of the pump 5, then the air pressure must be higher than if air 2' is introduced upstream of the pump. Penetration of milk into the air supply line is easier to prevent in the case of upstream introduction 3' since no excess pressure builds up before the pump 5.

Alternatively, it is also possible (here as in the following embodiments) to let the downstream end of the supply line 2 end in the milk pump 5 (not shown here).

In the portion of the discharge line 4 which is situated downstream of the mixing unit 6 and also of the opening 17, a mixing region 11 which is configured here as a Venturi nozzle V is integrated in this discharge line 4. The Venturi nozzle is thereby integrated in the dispensing head 19 of the fully automatic coffee machine (the outlet 4b of the Venturi nozzle V forms a separate discharge line of this dispensing head 19; a further dispensing line of the dispensing head 19 via which the coffee produced with the fully automatic coffee machine in cold or hot form can be dispensed into the external cup T, is only indicated here).

The downstream end (see subsequently) of a steam supply line 12 forms the inlet of the Venturi nozzle V. The downstream end 4b of the discharge line 4 for discharging the mixture M/L of milk and air or M/L/D (see subsequently) of milk, air and steam into the cup T forms the outlet of the Venturi nozzle. The end 4b of the discharge line 4 and the downstream end of the steam supply line 12 are configured for this purpose by two cones which are directed towards each other, are united at the position of their smallest diameter and form there the mixing region 11. At this position of the smallest diameter, the removal pipe 4a of the Venturi nozzle V which is configured here by a portion of the discharge line 4 situated downstream of the opening 17 is placed. (Viewed in the flow direction, the discharge line 4 firstly includes the mixing unit 6, then the T-shaped opening part 17, finally the removal pipe 4a of the Venturi nozzle V and at the end the outlet 4b of the Venturi nozzle V for discharging the mixture into the cup T).

Upstream of the inlet into the Venturi nozzle V, the steam supply line 12 is configured as follows: at the upstream end, orientated away from the Venturi nozzle V, a steam producer 18, known per se, is connected to the steam supply line 12. Between the steam producer 18 and the end of the steam supply line 12, orientated towards the Venturi nozzle, a stop valve 21 with which the steam supply can be opened and stopped again is integrated in said steam supply line 12.

A further air supply line 14 opens, at its downstream end, via a simple T-shaped line part between the valve 21 and the downstream end of the steam supply line 12 into the latter. In the further air supply line 14, at the upstream end thereof, a third conveying unit (air pump 13) is integrated, with which air L can be suctioned in from the environment or conveyed and added to the steam D supplied via the valve 21. The conveying power of this pump is likewise regulatable by the microprocessor-based control unit, not shown, so that the ratio of the quantities of air L and steam D, conveyed per unit of time via the line 12 into the Venturi nozzle V, i.e. the mixture ratio of the air-steam mixture L/D introduced into the Venturi nozzle V, can be adjusted to a desired value. Via this conveyance of steam D or of the air-steam mixture L/D into the Venturi nozzle V, because of the narrow place 11 thereof (mixing region), milk M is suctioned in, due to the Venturi principle which is known per se, via the bypass line 15 and the portion 4a and is entrained (see subsequently). Hence by controlling the three conveying units 5, 8 and 13 (or the two conveying units 5 and 13 and also the valve 20) and also the valve 21, a desired mixture of milk, air and steam M/L/D is dispensed via the outlet 4b of the Venturi nozzle 11 out of the dispensing head into the cup T.

The ratio of suctioned-in milk M (regulatable possibly via adjustment of the valve 16) and of throughflowing quantity of steam D determines the temperature of the milk froth discharged into the cup T.

With the shown device according to the invention or the illustrated fully automatic coffee machine, both cold milk froth and hot milk froth with a variable composition can hence be produced in two different modes of operation:

In a first operating mode (cold milk froth) the valve 21 is closed and conveyance of air L via the pump 13 is adjusted so that merely the line path 4a, 4b of the Venturi nozzle or of the dispensing head 19 is used for dispensing. According to a preselected mixing ratio (pump 5 and pump 8 or valve 20), milk is conveyed via the pump 5 in the first switching state of the three-way valve 16 (bypass line 15 closed), a predetermined quantity of air L is added to this milk M via the opening 3, the resulting mixture M/L is pressure-reduced in two steps via the mixing unit 6 of the discharge line 4 and is added to the cup T via the line path 4a, 4b. Then unheated, i.e. generally cold milk froth (corresponding to the temperature of the milk M in the container B) is situated in the cup T, to which cold milk froth for example cold extracted coffee can be added by suitable configuration of the fully automatic coffee machine (not shown).

In the second operating mode (hot milk froth), the conveyance is adjusted by the pump 8 (also a stop valve 22 which is provided here in addition and positioned downstream of the pump 8 in the line path 2 in front of the opening of the line 30 into the line 2 can be closed) and the valve 20 is closed so that no air supply L is effected via the opening 3. Then the second switching position of the three-way valve 16 is activated (bypassing elements 5, 6), i.e. the bypass path 15 is adjusted. Valve 21 is opened (possibly additionally air is conveyed via the pump 13). The hot steam D flowing via the line path 12, 4b (or the mixture of air L and hot steam D) entrains milk M by means of the Venturi principle during flow into the cup T via the line path 1, 16, 15, 17 and 4a, this milk being frothed in the mixing region 11 (or the corresponding narrow place of the Venturi nozzle V) with the hot steam D or the hot steam component of the mixture L/D. The warm or hot milk froth is then conveyed into the cup T via the outlet 4b of the Venturi nozzle V before for example hot coffee can be added thereto via the separate further dispensing line, not shown here, of the dispensing head 19.

In an alternative embodiment (not shown here), the opening 17 of the bypass line 15 can also be configured upstream of the mixing unit 6 or of the two diaphragms 7a and 7b so that only the pump 5 is bypassed with this bypass path. In this case, the two diaphragms 7a, 7b can be configured not as rigid perforated diaphragms but as variable diaphragms (e.g. lamellar diaphragms). If the diaphragms are then actuated by the control unit, likewise not shown, then it is possible to open these diaphragms less in the first operating mode (cold milk froth) and, in the second operating mode (production of hot milk froth via a passive milk suction by means of the Venturi principle), to open them more. This has the following advantage: the volume flow of milk is regulatable and hence, in the case of for example a constant steam flow, the dispensing temperature of the hot milk froth or of the hot milk.

FIG. 1 hence shows in particular a device for frothing up with a milk conveying device 5 for conveying and producing pressure for the milk M, a supply line 2 for the air, an introduction point 3, in which air L and milk M are brought together and is distinguished as a priority by the fact that both the milk M (pump 5) and the air L (pump 8) can be conveyed actively and that the milk-air mixture M/L is pressure reduced in multiple steps via the two steps 7a, 7b of the mixing unit 6. By introducing steam via the line 12, the illustrated system can also be used for the production of hot milk froth or hot milk. The illustrated system need not however be integrated in a fully automatic coffee machine, rather it can also be configured (not shown here), as stand-alone solution, i.e. as independent device for producing merely cold milk froth (omitting the elements 11, 12, 13, 14, 18 and 21) or optionally cold and also hot milk froth (see FIG. 1).

In particular the use of both diaphragms 7a, 7b enables a simple solution which nevertheless permits optimal adjustment of the consistency of the milk froth, with simultaneously simple cleaning of the corresponding components and low complexity with respect to constructional implementation.

In the first embodiment according to FIG. 1, a two-step mixing or pressure reduction of the mixture M/L need not be produced in the mixing unit 6. Basically, it is also possible to omit one of the two diaphragms 7a, 7b and hence to provide merely a single narrow place. Of course, the narrow place(s) can also be produced with constructional means other than with perforated diaphragms.

FIG. 2 shows a second embodiment according to the invention of a fully automatic coffee machine which, by being equipped with a device according to the invention, is suitable for producing cold milk froth or optionally also hot milk froth. This fully automatic coffee machine is basically configured as shown in FIG. 1 so that, subsequently, merely the differences in construction and in the mode of operation are described (identical reference numbers in FIG. 2, in comparison with FIG. 1, designate identical components; this also applies to all other Figures).

In contrast to FIG. 1, there is omitted in the device shown in FIG. 2 the compressed air container 9, the compressed air line 30 and also the valve 20 so that the air L here can be supplied merely by operation of the pump 8 via the line 2 and the opening 3 which is integrated here in the milk line 1 downstream of the first conveying unit 5 and upstream of the diaphragm 7a.

In the air supply line 2, the stop valve 22 for closing and opening the air supply line 2 is integrated downstream of the second conveying unit 8 and upstream of the opening 3 (provided that no air is conveyed by the pump 8, this valve is closed in general).

In the device shown in FIG. 2, the bypass line 15 is omitted in addition so that also no three-way valve 16 is required upstream of the first pump 5.

In addition, the mixing region 11 in FIG. 2 downstream of the second diaphragm 7b is configured not as a Venturi nozzle but as a simple T-shaped line part into which, on the one hand, the steam D can be conducted via the steam supply line 12 and, on the other hand, via the line portion of the discharge line 4 situated downstream of the diaphragm 7b, the mixture M/L. In the T-shaped line part or in the mixing region 11, the mixture M/L is then mixed with the steam D in the case of producing hot milk froth. (Elements 13 and 14 are dispensed with here.)

For supplying the steam D to the mixing region 11, the steam producer 18 is disposed in the steam supply line 12 at the upstream end thereof. Downstream of the steam producer 18, i.e. between the latter and the mixing region 11, the stop valve 21 for blocking the steam path 12 is integrated in the line 12. The mixture M/L/D, i.e. the composition of the hot milk froth, can be controlled by the pump power of the pumps 5, 8 and possibly 13.

If warm or hot milk froth is not intended to be produced but rather cold milk froth, then the steam stop valve 21 is completely closed. The consistency of the milk-air mixture or of the milk froth, produced by the two diaphragms 7a, 7b, is adjusted in this case by the conveying powers of the two pumps 5 and 8 as desired.

FIG. 2 hence shows a system according to the invention for producing cold and hot milk froth in a simplified configuration. Cold milk froth is produced by means of suctioning in milk by the conveying device 5, by active introduction of the air by means of the second conveying device 8 into the milk line 1 and by subsequent pressure reduction at both diaphragms 7a, 7b which are integrated in succession in the discharge line 4. Instead of the diaphragms, of course flow constrictors or other elements which form a narrow place can also be used here. Of course, it suffices in principle also to integrate merely one diaphragm or narrow place. For hot milk froth, hot steam is added to the cold milk froth, supplied by the mixing unit 6, via the steam line 12 from the steam producer 18 (the steam producer 18 can thereby be configured as a steam jet condensation pump).

Alternatively, it is also possible in FIG. 2 to produce the opening 3 in the milk line 1 not downstream of the first pump 5 but upstream of the same.

FIG. 2a shows a further fully automatic coffee machine according to the invention together with frothing device which is configured basically as shown in FIG. 2 so that merely the differences with respect to FIG. 2 are described subsequently.

As FIG. 2a shows, the downstream end of the steam supply line 12 can open at different places between the milk pump 5 and the outflow 19. The opening of the steam supply line 12 can hence be effected (downstream of the pump 5) both in the liquid supply line 1 and in the discharge line 4. Also opening of the steam supply line 12 into the air supply line 2 is possible. The opening (i.e. the corresponding mixing region which is configured here as a simple T-shaped line part) can hence be effected between pump 5 and opening 3 of the air supply line 2, compare 11' in the air supply line 2 between valve 22 and opening 3, cf. 11'''' between the opening 3 and the first diaphragm 7a (cf. 11'') between the first diaphragm 7a and the second diaphragm 7b (cf. mixing region 11'''), or also directly inside the outflow 19 into the discharge line 4 (not shown here, merely corresponding line guide 12'''' of the steam supply line is visible). The steam supply lines 12, 12', . . . which belong to the individual mixing regions 11, 11', . . . are thereby generally alternatives, i.e. merely one mixing region 11, 11', . . . is produced at one defined place. Basically however, it would also be conceivable to produce a plurality or all of the shown mixing regions 11, 11', . . . and lines 12, 12', . . . by suitable branching lines.

Steam D (or a mixture of air L and steam D in the case of the presence of a third conveying unit 13 together with a further air supply line 14, illustrated optionally here) can be introduced therefore at any place between the milk pump 5 and the outflow 19 in the milk- or milk-air mixture line 1, 4 or also directly in the outflow 19 or also in the air supply line 2 between the valve 22 and the opening or the mixing region 3. The mixing regions 11', 11'', 11''' and 11'''', disposed upstream of at least the second diaphragm 7b, thereby have the advantage of common pressure reduction of steam D, milk M and air L (the latter provided valve 22 is opened) at least one of the diaphragms 7a, 7b. As a result, the consistency of the froth can be varied specifically or adjusted to a desired condition. The mixture M/L/D or M/D can hence be subjected to one pressure reduction 7b or two pressure-reduction steps 7a, 7b.

Hence penetration of steam D or a steam-air mixture D/L into the milk or milk-air mixture at high pressure, is possible with a single pressure reduction 7b or a first pressure reduction 7a and a subsequent second pressure reduction 7b (two-step pressure-reduction mechanism).

FIG. 3 shows a further fully automatic coffee machine according to the invention together with frothing device which is configured basically as shown in FIG. 2 so that again merely the differences are described subsequently.

In the illustrated case, the air supply line 2 opens into the milk line 1 via the opening 3 situated in the milk line 1 upstream of the first pump 5. Also in the illustrated case, air L is hence added actively to the milk M by the stop valve 22 integrated in the air supply line 2 being opened and air L being conveyed via the pump 8 which has been set in operation.

A further difference from the case shown in FIG. 2 is that the mixing unit 6 here comprises merely precisely one narrow place 7 which can also be configured here for example as a perforated diaphragm. Also other embodiments are possible for example as throttle valve, as needle valve, as nozzle, hose clamp or longitudinally extended annular gap.

Downstream of the mixing unit 6 and upstream of the mixing region 11, which is configured here likewise as simple T-shaped line part, a settling stretch 10 is integrated in addition in the discharge line 4, which settling stretch is configured here (not shown in detail), for example as a 50 cm long, e.g. meandering, e.g. rigid, pipe which has a circular cross-section and a constant inner diameter. The settling stretch leads to a gradual, slow pressure reduction of the mixture M/L which has been swirled by the narrow place 7. Because of its length, it leads to the mixture M/L, present firstly in turbulent form, being converted into laminar form before it is finally discharged into the cup T (in the case of cold milk froth) via the dispensing head 19. (When producing hot milk froth, steam D is added in addition, as described in the embodiment of FIG. 2.)

The settling stretch 10 can however also be integrated not immediately after the element 6 but after the T-intersection 11.

FIG. 4 shows a further embodiment of a device according to the invention with which merely cold milk froth (i.e. milk froth based on unheated milk M) can be produced. This device is configured as independent device which is not integrated in a fully automatic coffee machine but otherwise is configured basically like the integrated device shown in FIG. 2 so that again merely the differences are described subsequently.

In the case shown in FIG. 4, the elements 12, 18 and 21 shown in FIG. 2 are omitted; hence the supply of steam D is omitted. For this reason, also no T-shaped line part as mixing region is necessary in the discharge region of the discharge line 4 so that the portion of the discharge line 4 produced downstream of the second diaphragm 7b is configured as a simple pipe portion which leads into a dispensing head 19.

The invention claimed is:

1. A device for frothing up a liquid and for active introduction of air via an air supply line into the liquid, said device comprising:
   a liquid supply line for supplying the liquid,
   the air supply line which opens into the liquid supply line for supplying the air into the liquid,
   a discharge line which is configured downstream of the opening of the air supply line into the liquid supply line for discharging the mixture of liquid and air,
   a first conveying unit, in particular a pump, which is provided for conveying the liquid through the liquid supply line and/or the mixture through the discharge line and
   a mixing unit which is provided downstream of the opening in the discharge line, the mixing unit including or being configured as at least one constriction of the discharge line;
   wherein the air supply line, the liquid supply line or the discharge line has a mixing region into which a steam supply line opens for supplying steam or a mixture of air and steam to the liquid or to the mixture of liquid and air; and
   wherein the mixing region is disposed upstream or downstream of the mixing unit or in the mixing unit and/or downstream of the first conveying unit, and/or in that active air can be introduced into the steam supply line, in order to produce the mixture of air and steam, the mixture being produced by a further, third conveying unit, in particular a pump, for conveying air, which is disposed in a further air supply line which opens into the steam supply line, and/or by a further compressed air container which is connected at the end of the further supply line, which is orientated away from the opening of such a further air supply line into the steam supply line, to said further air supply line.

2. The device according to claim 1, wherein, for active introduction of the air, a further, second conveying unit is provided for conveying the air, the device for frothing up the liquid including in this case precisely two conveying units.

3. The device according to claim 1, wherein the air supply line opens by its downstream end into the liquid supply line upstream of the first conveying unit, or in that the air supply line opens by its downstream end into the liquid supply line downstream of the first conveying unit, or in that the air supply line opens by its downstream end into the first conveying unit.

4. The device according to claim 1, wherein the mixing unit includes at least constrictions that are integrated in succession in the discharge line.

5. The device according to claim 1, wherein at least one of the constrictions is/are configured or provided as follows:
   as a throttle or needle valve,
   as a nozzle,
   as a clamp, for a flexible discharge line portion,
   in the form of a discharge line configured as a variable clamp or a variable hose clamp,
   as a diaphragm, in particular as cross-sectional-tapering perforated diaphragm with a perforation diameter which can be varied or is adjusted to a fixed value or as an annular gap diaphragm with a gap width which can be varied or is adjusted to a fixed value, or
   as a longitudinally extended annular gap which widens constantly about a cone in downstream direction, and/or
in that at least one of the constrictions is/are configured either with a variable free cross-sectional area F, $F_a$ or $F_b$ or is/are configured with a predetermined, free cross-sectional area F, $F_a$ or $F_b$ which is adjusted in a fixed manner.

6. The device according to claim 1, wherein a portion of the discharge line, downstream of the mixing unit, is configured as a settling stretch with which the turbulent proportion of the flowing mixture of liquid and air can be reduced such that the laminar proportion of this flowing mixture can be increased, the portion having a constant line cross-section on a predefined length in the flow direction.

7. The device according to claim 1, wherein one of the three subsequently listed features is provided for the first conveying unit:
   the first conveying unit is disposed upstream of the opening, and integrated in the liquid supply line,
   the first conveying unit is disposed in the region of the opening, and integrated in the liquid supply line and/or in the discharge line,
   the first conveying unit is disposed downstream of the opening, and integrated in the discharge line; and
in that the mixing unit, is configured either as part of the first conveying unit and/or is disposed downstream of the first conveying unit.

8. The device according to claim 1, wherein the mixing region is configured as an opening of a line portion into another line portion, or in that the mixing region is configured as a Venturi nozzle, the steam supply line leading into the mixing region forming the inlet of the Venturi nozzle, the portion of the discharge line leading out of the mixing region in the downstream direction forming the outlet of the Venturi nozzle and the portion of the discharge line leading into the mixing region from the upstream direction forming the removal pipe of the Venturi nozzle.

9. The device according to claim 1, comprising a bypass line which branches off from the liquid supply line upstream of the first conveying unit and opens into the discharge line either downstream of the mixing unit or opens upstream of the mixing unit but downstream of the first conveying unit into the liquid supply line and/or the discharge line, the branching being configured preferably as a multiway switching unit with which the liquid to be supplied can be guided to the discharge line optionally either via the bypass line or via the first conveying unit.

10. A drink preparation apparatus, said apparatus including a device for frothing up a liquid according to claim 1, wherein the downstream end of the discharge line of the device is configured as separate dispensing line of a dispensing head.

11. A method for frothing up a liquid, in particular cold and/or unheated milk, wherein the frothing up is implemented with a device according to claim 1.

12. The device according to claim 4, wherein a ratio $F_a/F_b$ of a free cross-sectional area $F_a$ of a first constriction situated upstream and of a free cross-sectional area $F_b$ of a second constriction situated downstream is in the range between 1/1.05 and 1/16.

13. The device of claim 8, wherein the mixing region is configured as an opening of a line portion into another line portion as a T-shaped line part.

14. The device of claim 1, wherein for active introduction of the air, a compressed air container which is connected at the upstream end of the air supply line, which is therefore orientated away from the opening, to said air supply line, with which compressed air container, compressed air can be supplied to the air supply line, the device for frothing up the liquid including, precisely one conveying unit.

15. A device for frothing up a liquid and for active introduction of air via an air supply line into the liquid, said device comprising:
   a liquid supply line for supplying the liquid,
   the air supply line which opens into the liquid supply line for supplying the air into the liquid,
   a discharge line which is configured downstream of the opening of the air supply line into the liquid supply line for discharging the mixture of liquid and air,
   a first conveying unit, in particular a pump, which is provided for conveying the liquid through the liquid supply line and/or the mixture through the discharge line and
   a mixing unit which is provided downstream of the opening in the discharge line, the mixing unit including or being configured as at least one constriction of the discharge line,
   wherein the air supply line, the liquid supply line or the discharge line has a mixing region into which a steam supply line opens for supplying steam or a mixture of air and steam to the liquid or to the mixture of liquid and air, and
   wherein the mixing region is configured as an opening of a line portion into another line portion, or in that the mixing region is configured as a Venturi nozzle, the steam supply line leading into the mixing region forming the inlet of the Venturi nozzle, the portion of the discharge line leading out of the mixing region in the downstream direction forming the outlet of the Venturi nozzle and the portion of the discharge line leading into the mixing region from the upstream direction forming the removal pipe of the Venturi nozzle.

16. A device for frothing up a liquid and for active introduction of air via an air supply line into the liquid, said device comprising:
   a liquid supply line for supplying the liquid,
   the air supply line which opens into the liquid supply line for supplying the air into the liquid,
   a discharge line which is configured downstream of the opening of the air supply line into the liquid supply line for discharging the mixture of liquid and air,
   a first conveying unit, in particular a pump, which is provided for conveying the liquid through the liquid supply line and/or the mixture through the discharge line and
   a mixing unit which is provided downstream of the opening in the discharge line, the mixing unit including or being configured as at least one constriction of the discharge line,
   wherein the air supply line, the liquid supply line or the discharge line has a mixing region into which a steam supply line opens for supplying steam or a mixture of air and steam to the liquid or to the mixture of liquid and air, and
   wherein the mixing unit includes at least constrictions that are integrated in succession in the discharge line.

* * * * *